United States Patent [19]
Bold et al.

[11] Patent Number: 5,248,487
[45] Date of Patent: Sep. 28, 1993

[54] PROCESS FOR THE CONVERSION OF CALCIUM SULFATE DIHYDRATE INTO ALPHA-HEMIHYDRATE

[76] Inventors: Jorg Bold, Ohlkasterhohl 2, D-6750 Kaiserslautern; Frank Fink, Bismarckstrasse 56, D-6600 Saarbrucken; Jurgen Umlauf, Hinterm Weiher 27, D-7800 Freiburg 36, all of Fed. Rep. of Germany

[21] Appl. No.: 816,222

[22] Filed: Jan. 3, 1992

Related U.S. Application Data

[63] Continuation-in-part of Ser. No. 758,248, Sep. 11, 1991, abandoned, which is a continuation of Ser. No. 276,326, Nov. 18, 1988, abandoned.

[30] Foreign Application Priority Data

Mar. 21, 1987 [DE] Fed. Rep. of Germany ....... 3709393

[51] Int. Cl.⁵ ..................... C01F 11/46; C04B 11/02
[52] U.S. Cl. .................................. 473/171; 423/172; 423/555; 106/786
[58] Field of Search ............... 423/170, 171, 172, 555; 106/786

[56] References Cited

U.S. PATENT DOCUMENTS

| | | | |
|---|---|---|---|
| 2,448,218 | 8/1948 | Haddon | 423/555 |
| 3,337,298 | 8/1967 | Ruter | 423/555 |
| 3,410,655 | 11/1968 | Ruter et al. | 423/170 |
| 3,410,658 | 11/1968 | Ruter | 423/170 |
| 3,615,189 | 10/1971 | Hayakawa et al. | 423/555 |
| 4,091,080 | 3/1978 | Kosugi et al. | 23/300 |
| 4,120,737 | 10/1978 | Berrie et al. | 423/555 |
| 4,842,842 | 6/1989 | Kudo | 423/555 |

FOREIGN PATENT DOCUMENTS

| | | |
|---|---|---|
| 2310799 | 9/1973 | Fed. Rep. of Germany . |
| 3119749 | 11/1984 | Fed. Rep. of Germany . |
| 2570367 | 3/1986 | France . |
| 53-29297 | 3/1978 | Japan ............ 423/171 |
| 55-23019 | 2/1990 | Japan ............ 423/171 |
| 345098 | 7/1972 | U.S.S.R. ........ 423/555 |
| 1101771 | 1/1968 | United Kingdom . |

*Primary Examiner*—Gary P. Straub
*Attorney, Agent, or Firm*—James Creighton Wray

[57] ABSTRACT

In a process for the conversion of calcium sulfate dihydrate originating in flue gas desulfurization units into an alpha-hemihydrate, a salt solution is used as a medium. The salt solution consists substantially of concentrated scrubbing liquid from the flue gas desulfurization process containing alkali-earth chloride in a chloride concentration of 10% to 60% by weight.

15 Claims, 2 Drawing Sheets

PROCESS FOR THE CONVERSION OF CALCIUM SULFATE DIHYDRATE INTO ALPHA-HEMIHYDRATE

This application is a continuation-in-part of application Ser. No. 758,248 filed Sep. 11, 1991 now abandoned which is a continuation of application Ser. No. 276,326 filed Nov. 18, 1988 now abandoned.

BACKGROUND OF THE INVENTION

This application is a continuation-in-part of application Ser. No. 07/276,326 filed Nov. 18, 1988.

The invention concerns a process for the conversion of calcium sulfate dihydrate from flue gas desulfurization units (FGD-gypsum) into alpha-hemihydrate (alpha-gypsum), in a salt solution used as a calcinating medium.

For the elimination of sulfur dioxide from flue gases of power plants, two processes among different alternatives are predominantly adopted which are characterized by the use of calcium (hydroxide or of calcium carbonate as a source of calcium ions. The last one is prevailing at new installations, for the reason that the operational costs are lower and the quality of the by-product gypsum is more consistent. The present invention is based on the carbonate process.

Calcium carbonate is abundant in nature in the form of limestone. Though not desired, because of its low reactivity, it always contains at least traces of magnesium carbonate respectively dolomite ($CaMg(CO_3)_2$).

Hard coal always contains traces of chlorides, which are decomposed during firing in oxide and volatile hydrochloric acid (HCl). HCl reacts with the carbonate, forming chlorides of the present cations. Being highly soluble, the chlorides are enriched and so they are the limiting factor in recycling the scrubbing liquid. Simultaneously the soluble salts of magnesium are enriched. Regularly the concentration of all dissolved salts in the scrubbing liquid must not surpass 7% and is held in practical operation in the order of 5% by weight.

As a consequence, the precipitated calcium sulfate dihydrate must be not only dewatered, e.g. by a centrifuge, but washed when it will be used in a conventional manner as raw material for all kinds of building plaster.

However, especially in the case of very large power plants, the huge amount of gypsum produced as a by-product often cannot be absorbed by the manufacture of building materials. Piling up at disposals is considered more and more as a danger for the environment.

Additionally, environmental requirements do not permit the dumping of residual scrubbing liquid everywhere. In many cases there is a need to concentrate it by mechanical and thermal treatment to convert it into solid form. That treatment can be done step by step, supplying intermediate brines of different concentration.

A logical way out of those problems can be a re-use of the FGD-gypsum in the coal mine, where it comes from originally. For deep mining, it is an accepted state of the art, that of all kinds of binders on the base of calcium sulfate, Alpha-Gypsum is the best choice. It provides the best mechanical resistances in a short time (sometimes critical for use in mines) and it is not sensitive to elevated temperatures as it is anhydrite.

To convert dihydrate into alpha-hemihydrate by hydrothermal crystallization, it is a known process to subject washed dihydrate essentially free of chlorides to hydrothermal treatment in sulfuric acid solution or in autoclaves.

Further, from DE-OS 31 19 749 it is known to convert the FGD-gypsum by an autoclave treatment without previous washing, that is, in the presence of a scrubbing solution containing approximately 5% by weight of alkali-earth chloride, mainly calcium chloride. The alpha-gypsum obtained by that method is especially suited for use in underground mining, since the efflorescence caused by the chloride contents does not matter and, according to that specification, the mechanical characteristics which are more important are favorably influenced.

However, the conversion of dihydrate containing chloride cannot be done in a sulfuric acid solution since hydrochloric acid would be generated during contact with chloride. Therefore, in the known process, they use conventional autoclaves.

However, the conversion in autoclaves under pressure represents a major investment in machinery and consumes much energy. Additionally, that type of installation requires a relatively large maintenance effort. Altogether conversion with autoclaves is expensive.

SUMMARY OF THE INVENTION

The task of the present invention consists of describing a simple and economic process for the conversion of dihydrate stemming from flue gas desulfurization units into alpha-hemihydrate.

It consists essentially of:

using the scrubbing liquid of the desulfurization plant which has been concentrated to a concentration of alkali-earth chloride of 10% to 60%, preferably 20% to 40%, by weight as the salt solution;

adding 5% to 30% by weight, preferably of 8% to 15% by weight by weight (base starting dihydrate) of seed crystals; maintaining a solid content of the starting slurry in a range of 15% to 30%, preferably in a range of 18% to 25%.

heating to a temperature of 85° C. to 98° C. until the conversion is completed.

Compared with autoclave processes, the process according to the present invention has considerable advantages:

Since it operates without pressure, it requires less sophisticated machinery.

Since the preferred conversion temperature is below 100° C. and the conversion time is longer than in an autoclave process, there is no need for a high heat transfer. That fact provides the possibility of using low-grade heat, that is, waste heat.

The low operating temperature allows the use of plastic reactors, thus preventing corrosion problems.

The most heat-consuming step, the concentrating of the scrubbing liquid or, in the loop, reconcentrating of the salt solution, might be part of the existing FGD-plant. If not, it can use at least partially the heat of the flue gases of the power-generating boiler.

Even if the conversion can be executed with the original concentrated scrubbing liquid, the natural fluctuations in its composition can generate different behavior. A usual way to overcome those problems is to maintain a level of the varying components that is higher than their natural upper level. Surprisingly, we found that for the two most critical components their optimal level is very close to their natural upper level.

As mentioned above, the scrubbing liquid contains some magnesium salts, originating from the limestone. The magnesium content has an important influence on the speed and the completeness of the crystalline conversion. The optimal content is approximately 5% by weight of the salt solution. Generally 1% to 3% are reached by concentrating the original composition of the scrubbing liquid to the preferred total concentration. Therefore the maintenance of an optimal magnesium concentration by monitoring and adding of magnesium chloride is one feature of the present invention.

In the scrubbing liquid only traces of alkali salts are found. They come mainly from the fuel and are largely eliminated by the dust collectors. It has proven to be advantageous if little potassium is present in the salt solution. The optimal content is approximately 1% by weight of the salt solution. Generally 0.1% to 0.3% are reached by concentrating the original composition of the scrubbing liquid to the preferred total concentration. Therefore the maintenance of an optimal potassium concentration by monitoring and addition of potassium chloride is one feature of the present invention.

Traces of sodium salts may also be present. Sodium salts work differently than potassium salts. They are not critical for the process, when present only in traces.

The product resulting from the hydrothermal treatment does not only depend on the concentration and composition of the salt solution, but significantly on the temperature and residence time. For high-strength plaster, well shaped idiomorphical crystals are required. Their formation needs a minimum residence time. Residence time and temperature are related in a way, that at higher temperatures the conversion proceeds at longer residence time to anhydrite. That means that a long residence time is not possible at higher temperatures, or that at higher temperatures only shorter residence time and therefore smaller crystals can be achieved.

We found that an alkali-earth concentration range of 20% to 30% and a temperature range of 85° C. to 98° C. provides the conditions that allow residence times in a range of 1 h to 3 h.

The alpha-hemihydrate obtained according to the present invention shows a very compact crystal structure, i.e., columns or hexagonal cubes. More than 90% of the generated hemihydrate shows a crystal size of 20 to 100 micrometers. This relatively large-grained product can be processed without any dust and is, therefore, specially suited for use in mining.

The crystal shape can be specifically modified by the addition of substances, such as succinate, maleic acid, or also sulfonates. Surprisingly we found that in the specific combination with calcium and magnesium chloride, the potassium not only accelerates the conversion, but works as a modifier for the crystal habitus in the desired direction. In most cases one can renounce the addition of the conventional modifiers.

The solid content of the slurry can influence the resulting product as well. At very low solid matter content, e.g. <1%, very long whisker-like crystals are observed. High solid content, e.g. >40%, generates secondary seeds by friction. High solid content is sensitive in respect to fluctuations in particle size and shape, possibly causing problems with stirring. A solid concentration of approximately 20% has proven to be well suited for the process.

However, it is possible to increase the solid content by adding subsequently some more dihydrate when the conversion has taken place substantially. That procedure carries a considerable advantage. Since a large amount, exceeding that of the added dihydrate, of large seed crystals is present, the newly formed hemihydrate is deposited mainly on the surface of the existing crystals, thus increasing their size. Additionally, with larger particle size and higher density of the formed alpha-hemihydrate (in comparison to dihydrate), the solid content can be increased up to 40%, thus increasing the productive capacity of the installation.

If the conversion takes place in a concentrated scrubbing liquid with an alkali-earth chloride content above 45% by weight and at temperatures above 85° C., a fine-qrained hemihydrate with crystal sizes <10 micrometers is obtained which, due to dust problems, is unsuited for underground mining. However, since crystallization takes place faster within this range, seed crystals are appropriately produced by that method, which are then fed into the process. Those seed crystals are generated in a separate reactor using a salt solution, preferably with low potassium content in order to generate more needle-like crystals.

Aside from the above-mentioned addition of appropriate substances, the crystalline size and shape of the obtained alpha-hemihydrate can also be influenced by the amount, size and shape of the added seed crystals. The amount of the added seed crystals will be within the range of 5% to 30% by weight in relation to the dihydrate, but preferably in the range of 8% to 15% by weight. Needle-like seeds have proven to be the most appropriate shape, because they provide the largest surface.

If crystallization is implemented in several reactors following one another, the concentration of the substances influencing the crystal shape can be selected in a different manner within the individual reaction stages, for example, the seed crystal and the growth periods.

Seed crystals can also be added in a conventional manner by feeding back converted material. That method may cause feedback effects and should be avoided as far as possible.

The obtained alpha-hemihydrate has to be separated from the brines. With low solid content hydrocyclones are the usual device for separating coarse and fine particles and increasing the solid content in the recovered slurry. In the present case, a vacuum drum or belt filter is preferable in order to avoid recycling of the fines, as explained above.

With a vacuum belt filter, a countercurrent washing can be done simultaneously. Scrubbing water from the flue gas desulfurization unit can be used so that the amount of soluble salts in the final product is at a similar level, as in the starting, unwashed dihydrate. The resulting alpha-gypsum can be used for mining mortars. The quantity of waste water which has to be evaporated is not increased in comparison to the case where no alpha-gypsum is produced.

The scrubbing liquid coming directly from the FGD-plant generally has a temperature of approximately 55° C. In order to avoid an early rehydrating, the wash water must be preheated to at least 90° C.

If the obtained alpha-gypsum is intended to be used for a different purpose where chloride is not admissible, then a second washing step with clear, preheated water is necessary.

Subsequent drying and grinding is considered state-of-the-art. However, direct drying with superheated steam is the best way when cheap low pressure steam is available. Otherwise indirect drying is recommended.

Principally, the above-described process can work continuously and in batchwise mode. However, the preferred mode is the continuous mode.

DETAILED DESCRIPTION OF THE DRAWINGS

Figure 1:
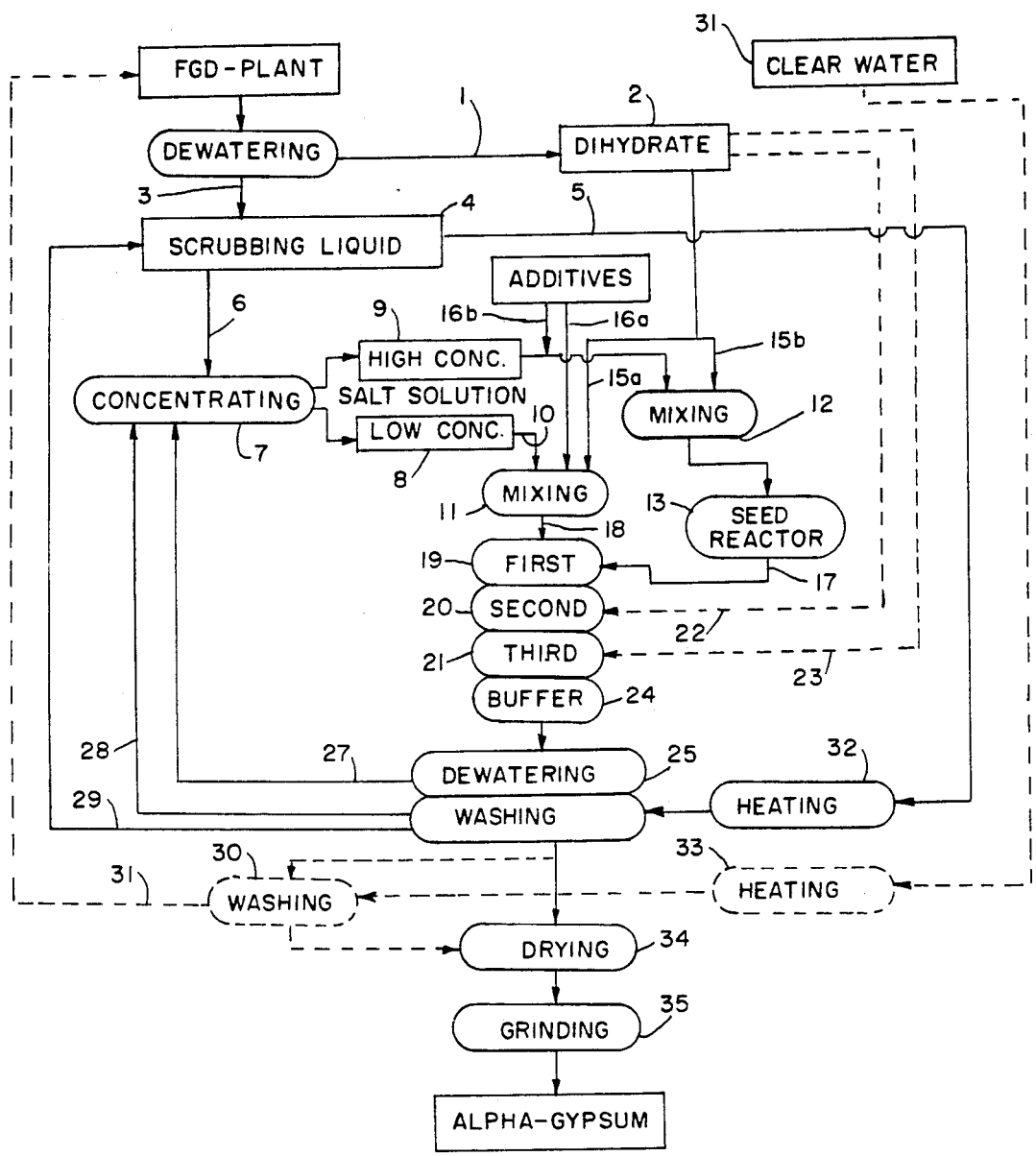
FIG. 1 schematically explains by a block diagram the process of the present invention in a continuous mode.

The dihydrate separated from the FGD-process is dewatered mechanically. The wet but not clear washed dihydrate is extracted by way (1) to a dosing bin (2). Scrubbing liquid which is removed from the scrubbing loop is fed by way (3) in a buffer tank (4).

The buffer provides wash liquid for the alpha-hemihydrate by way (5) and fills up by way (6) losses in the reconcentration loop of the conversion plant.

The reconcentration device (7) provides salt solutions of two different concentrations which are stored in the buffer tanks (8) for low concentration and (9) for high concentration. The low concentrated salt solution serves as mixing liquid for the main stream of product, and is fed by line (10) into the main mixer (11). The high concentrated brine is fed into the premixer (12) for the seed reactor (13) by line (14).

The dihydrate is metered and fed into the process by ways (15a) and (15b). Additives, that is, magnesium and potassium salts and, if necessary, modifiers, are equally added in the mixers by ways (16a) and (16b). That part of the drawing is simplified, because in reality there must be a metering device for all different kinds of additives.

The outlet (17) of the seed reactor (13) and the outlet (18) of the main mixer (11) feed the first main reactor (19). In that reactor the largest portion of the conversion takes place. In a second (20) and third (21) reactor the conversion is completed and the crystalline growth can take place. The number of reactors is not limited to three, but can be much more if considered useful.

Additional dihydrate can be added in the reactors (20) and (21) by the lines (22) and (23). In that case additional reactors must follow in order to complete the reaction and to avoid the risk of extracting more than traces of dihydrate.

After passing a buffer (24) which is held at a lower temperature than the operating temperature, the slurry is led in a dewatering device (25). In the preferred case, where it is a vacuum filter belt, the countercurrent washing (26) can be done in the same apparatus. The removed salt solution of the dewatering step is recycled completely in the reconcentration device (7) by line (27). The removed water from the countercurrent washing is partially recycled in (7) by line (28), and partially recycled in the scrubbing liquid buffer (4) by the line (29).

If desired, a second washing step (30) with clear water (31) can follow the first washing step. The removed water is recycled in the FGD-plant as process water by the line (31). Both types of wash water are preheated at nearly 100° C. in the preheaters (32) and (33).

Immediately after the washinq step, the wet alpha-hemihydrate has to be dried in a drier (34) and ground in a mill (35).

EXAMPLES

The following examples show the results of several tests, carried out according to the claimed process:

TABLE 1

| | Composition of the Salt Solution | | | | | | | |
|---|---|---|---|---|---|---|---|---|
| | | | | Na-Suc-cinate | Seeds | Solid Cont. | Temp. | Resid. Time |
| Test # | CaCl2 (%) | MgCl2 (%) | KCl (%) | (%) | (%) | (%) | (°C.) | (h) |
| 1 | 41.2 | 0.0 | 0.0 | 0.5 | 0.0 | 20.0 | 95.0 | 0.5 |
| 2 | 45.0 | 0.0 | 5.0 | 0.0 | 0.0 | 20.0 | 122.0 | 0.1 |
| 3 | 28.0 | 7.0 | 0.0 | 0.0 | 0.0 | 20.0 | 104.0 | 1.0 |
| 4 | 27.0 | 0.0 | 3.0 | 0.0 | 0.0 | 20.0 | 104.0 | 1.0 |
| 5 | 32.5 | 7.5 | 2.5 | 0.0 | 0.0 | 20.0 | 105.0 | 0.5 |
| 6 | 28.0 | 7.0 | 9.0 | 0.0 | 0.0 | 20.0 | 106.0 | 0.5 |
| 7 | 20.0 | 0.0 | 0.0 | 0.0 | 0.0 | 20.0 | 95.0 | 15.0 |
| 8 | 21.0 | 3.0 | 1.0 | 0.0 | 9.0 | 20.0 | 95.0 | 2.0 |
| 9 | 25.0 | 5.0 | 1.5 | 0.0 | 9.0 | 20.0 | 95.0 | 2.0 |
| 10 | 27.0 | 3.0 | 1.0 | 0.0 | 9.0 | 20.0 | 95.0 | 2.0 |

TABLE 2

Figure 2:
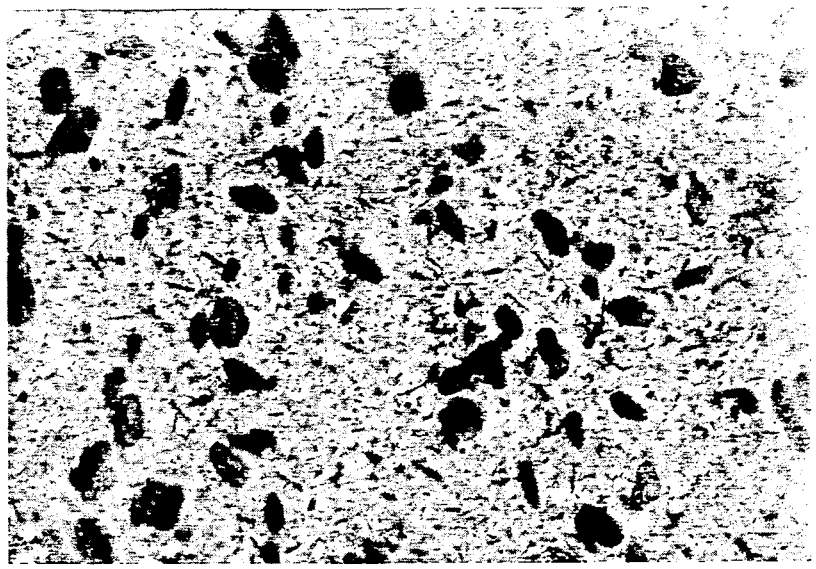
FIG. 2 is a photograph in which clustered small single crystals are found.
Figure 3:
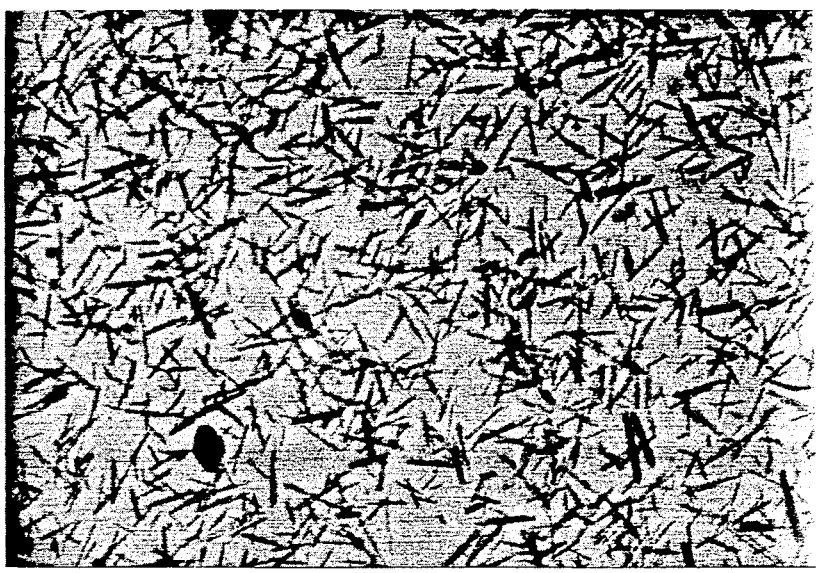
FIG. 3 is a photograph which shows the formation of needle-like crystals.
Figure 4:
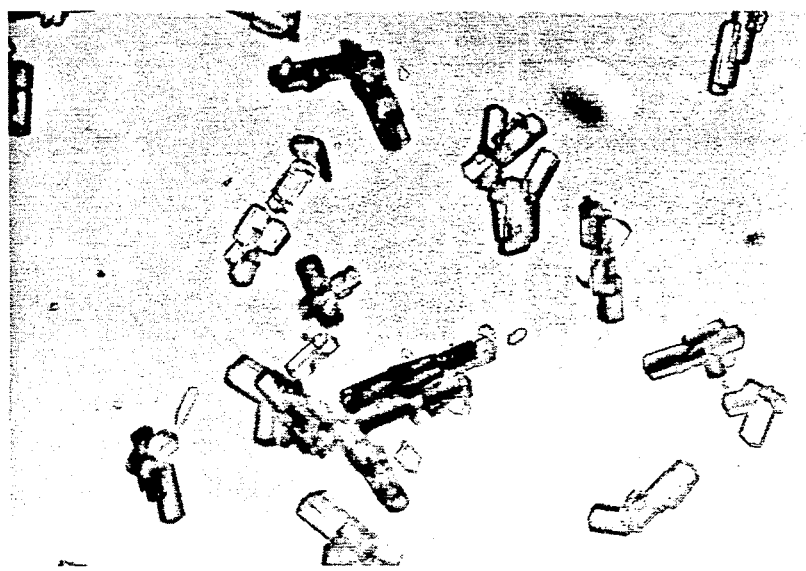
FIG. 4 is a photograph showing the large elongated prisms.

| Test # | Properties and Observations |
|---|---|
| 1. | Very small crystals, conversion progresses to anhydrite. |
| 2. | Very rapid conversion in solid state (topotactical). At longer residence time as the indicated 6 min. conversion to anhydrite. |
| 3. | Rapid conversion by topotactical formation of alpha-hemihydrate; disintegrates, with mechanical stress, into small single crystals. (FIG. 2) |
| 4. | Conversion directly to anhydrite. |
| 5. | Formation of well-shaped needle-like crystals. Average size approximately 10 μm. Can be used as seeds. (FIG. 3) |
| 6. | As in Test 5, crystal size 50% larger. |
| 7. | Inhomogeneous mix of very large and small crystals; partially anhydrite. |
| 8. | Large, short ('cubic') prisms. |
| 9. | As in Test 8, slightly smaller crystal size. |
| 10. | Large elongated prisms. (FIG. 4) |

Comment: Test No. 5 is an example of producing seed crystals. Tests No. 8, 9 and 10 are examples according to the present invention.

Regarding the complete series of tests, one can observe that generally:

the presence of more than 2% potassium accelerates the conversion to a non-controllable speed;

the presence of magnesium stabilizes the alpha-hemihydrate, which means that the complete conversion is promoted and the formation of anhydrite is retarded;

the presence of Na-Succinate retards the formation of hemihydrate and shortens the shape of the crystals.

a reliable product can also be made without the addition of a crystal modifier.

These and further and other objects and features of the invention are apparent in the disclosure, which includes the above and ongoing written specification, with the claims and the drawings.

While the invention has been described with reference to specific embodiments, modifications and variations of the invention may be constructed without departing from the scope of the invention, which is defined in the following claims.

We claim:

1. In a process for conversion of calcium sulfate dihydrate, obtained as effluent from flue gas desulfurization units, by wet scrubbing of sulfur dioxide using calcium carbonate as an absorbent, which scrubbing process produces calcium sulfate dihydrate which is separated and a calcium chloride containing scrubbing liquor which is recycled to the scrubbing process wherein said calcium sulfate dihydrate is converted into alpha-hemihydrate by suspending the dihydrate in a salt solution used as a calcination agent, comprising mixing the dihydrate with the salt solution to form a slurry; adding seeds; executing the conversion into alpha-hemihydrate at elevated temperature and at ambient pressure; washing and drying the obtained alpha-hemihydrate; and
the improvement comprising:
concentrating a portion of the scrubbing liquor to a calcium chloride content of about 20% to 40% by weight as the salt solution;
adding magnesium chloride and potassium chloride to the salt solution to increase the concentration of the magnesium chloride and potassium chloride in the salt solution to about 2 to 8% by weight magnesium chloride and about 0.5 to 2% by weight potassium chloride;
mixing said salt solution, said calcium sulfate dihydrate and
adding about 5% to 30% by weight of seed crystals; and
then heating the resulting mixture to an alpha-hemihydrate conversion temperature of 85° C. to 98° C. and maintaining said temperature for a period of time to form alpha-hemihydrate crystals.

2. The process according to claim 1, characterized by obtaining the seed crystals through the conversion of calcium sulfate dihydrate in a concentrated scrubbing liquor with an alkali-earth chloride content greater than 45% by weight under ambient pressure at temperatures higher than 85° C. but lower than the boiling point.

3. The process of claim 2, characterized by a part of the mixture being heated up to 98° C. to form the seed crystals.

4. The process according to claim 1, characterized by maintaining a solid content of the starting slurry in a range of 15% to 30%.

5. The process according to claim 1, characterized by adding, in at least one step, more dihydrate when the conversion of the dihydrate first introduced in the process has taken place substantially, up to a solid content of maximum 45%.

6. The process according to claim 1, characterized by using the scrubbing liquor from the flue gas desulfurization unit, which has not been concentrated, for washing the obtained alpha-hemihydrate.

7. The process according to claim 6, characterized by filtering and preheating the scrubbing liquor prior to the washing.

8. The process according to claim 6, characterized by washing the alpha-hemihydrate in a second step with preheated clear water.

9. The process according to claim 8, characterized by drying the washed alpha-hemihydrate with superheated steam.

10. The process according to claim 1, characterized by executing the reaction in a continuous way with an average residence time of more than 60 minutes and less than 180 minutes.

11. The process according to claim 10, characterized by passing the mixture through a series of at least two main reactors.

12. The process according to claim 1, characterized by continuous generation and addition of the seed crystals, which are produced with an average residence time in a seed reactor of 1 minutes to 30 minutes.

13. The process according to claim 1, characterized by executing the reaction batchwise with a residence time of more than 90 minutes.

14. The process of claim 1, characterized by said magnesium chloride and said potassium chloride being added prior to adding the seed crystals.

15. The process of claim 1, characterized by said magnesium chloride and said potassium chloride being added after adding the seed crystals.

* * * * *